(12) United States Patent
Park

(10) Patent No.: US 6,315,217 B1
(45) Date of Patent: Nov. 13, 2001

(54) FUEL ATOMIZING-INJECTION APPARATUS

(76) Inventor: Jae-Sung Park, Myungil LG Apt. 101-1012, 332, Myungil-Dong, Gangdong-Ku, Seoul (KR)

( * ) Notice: Subject to any disclaimer, the term of this patent is extended or adjusted under 35 U.S.C. 154(b) by 0 days.

(21) Appl. No.: 09/708,541

(22) Filed: Nov. 9, 2000

(30) Foreign Application Priority Data

Nov. 22, 1999 (KR) .................................................. 99-25691

(51) Int. Cl.[7] .............................. B05B 1/24; F23D 11/44; F02G 5/00; B60L 1/02
(52) U.S. Cl. ......................... 239/135; 239/128; 239/130; 239/133; 239/136; 219/205; 219/206; 219/207; 123/549
(58) Field of Search .................................... 239/128, 130, 239/133, 135, 136, 533.2, 585.1, 585.5; 219/205, 206, 207; 123/549

(56) References Cited

U.S. PATENT DOCUMENTS

| | | | |
|---|---|---|---|
| 4,572,146 | * | 2/1986 | Grünwald et al. .................... 123/549 |
| 4,627,405 | * | 12/1986 | Imhof et al. ...................... 239/133 X |
| 5,159,915 | * | 11/1992 | Saito et al. ....................... 239/128 X |
| 5,361,990 | * | 11/1994 | Pimentel .............................. 239/133 |
| 5,400,969 | * | 3/1995 | Keene .................................. 239/136 |
| 5,401,935 | * | 3/1995 | Smith et al. .......................... 219/206 |
| 5,598,826 | * | 2/1997 | Hunt et al. ............................ 123/491 |
| 6,189,518 | * | 2/2001 | Cooke ................................. 123/549 |

* cited by examiner

*Primary Examiner*—David A. Scherbel
*Assistant Examiner*—Robin O. Evans
(74) *Attorney, Agent, or Firm*—Arent Fox Kintner Plotkin & Kahn, PLLC

(57) ABSTRACT

A fuel atomizing-injection apparatus for internal combustion engines is disclosed. This apparatus is installed between the injector of a fuel injection device and the suction manifold of an engine, and is used for promoting vaporization of fuel injected from the injector into the suction manifold, thus finally allowing the injected fuel to be more effectively and actively mixed with combustion air into mixed gas. The apparatus also improves the fuel combustion efficiency of the engine while achieving a conservation of fuel and increasing engine output power. The apparatus exhausts little harmful gases into the atmosphere, thus being unlikely to cause environmental pollution, such as air pollution. In the fuel atomizing-injection apparatus, a heater, having a heat dissipating spiral plate on its external surface, is installed between the injector and the suction manifold. The heater heats, sprays, and whirls the injected fuel from the injection device, and so the heater promotes vaporization of the fuel injected from the injector into the suction manifold.

4 Claims, 3 Drawing Sheets

FUEL ATOMIZING-INJECTION APPARATUS

BACKGROUND OF THE INVENTION

1. Field of the Invention

The present invention relates to a fuel atomizing-injection apparatus for internal combustion engines and, more particularly, to a fuel atomizing-injection apparatus installed between a fuel injection device and a suction manifold of an engine and used for promoting vaporization of fuel injected from the fuel injection device into the suction manifold, thus finally allowing the injected fuel to be more effectively and actively mixed with atmospheric air used as combustion air into mixed gas.

2. Description of the Prior Art

As well known to those skilled in the art, a fuel injection device is used with an internal combustion engine, and mixes liquid fuel with combustion air at an appropriate ratio to form mixed gas. Such a conventional fuel injection device comprises several systems: a fuel supply system, a combustion air supply system, and a control system. In the fuel injection device, the fuel supply system pumps fuel from a fuel tank using a fuel pump so as to feed the fuel under high pressure to a fuel injector. The fuel supply system also maintains the pressure of the fuel, thus improving the precision of the fuel injecting operation. On the other hand, the combustion air supply system comprises an inlet airflow sensing device, a throttle body, and a surge tank, and is used for controllably feeding combustion air under pressure into a cylinder in accordance with the opening proportion of a throttle valve or of an air valve. The control system senses the quantity of inlet air, an engine rpm, and the opening proportion of the throttle valve prior to outputting sensing signals to a microcomputer. The control system also controls the fuel injection timing and the target quantity of injected fuel in response to input signals from a variety of sensors, such as a coolant temperature sensor and a combustion air temperature sensor.

When the fuel supply system of the conventional fuel injection device pumps fuel from the fuel tank using the fuel pump, the fuel primarily passes through a fuel filter so as to be filtered prior to being appropriately distributed to the fuel injector and a cold start injector by a delivery pipe. In such a case, a pressure regulator controls the pressure of fuel flowing to the fuel injector, and always maintains a desired fuel pressure higher than the inner pressure of the suction manifold. The pressure regulator also returns remaining fuel from the injector into the fuel tank.

The fuel injector injects fuel into the suction manifold in response to a control signal output from the microcomputer. The fuel injector comprises a solenoid coil, a plunger and a needle valve. In an operation of the injection device, the plunger is retracted with the solenoid coil being electrically activated, and so the needle valve integrated with the plunger opens the injection nozzle of the fuel injector, thus allowing the nozzle to inject the pressurized fuel into a cylinder. In such a case, the quantity of injected fuel is determined by the period of time when the needle valve is opened. That is, the quantity of injected fuel is determined by the period of time when the solenoid coil is turned on.

However, the conventional injection device cannot finely atomize the fuel during the injection of fuel, and so it is almost impossible to effectively mix the fuel with the combustion air. This finally reduces the combustion efficiency of the mixed gas in addition to consuming of an excessive quantity of fuel, and exhausts a variety of harmful unburnt gases into the atmosphere, thus causing environmental pollution, such as air pollution.

SUMMARY OF THE INVENTION

Accordingly, the present invention has been made keeping in mind the above problems occurring in the prior art, and an object of the present invention is to provide a fuel atomizing-injection apparatus, which is installed between a fuel injection device and a suction manifold of an engine, and is used for promoting vaporization of fuel injected from the fuel injection device into the suction manifold, thus finally allowing the injected fuel to be more effectively and actively mixed with atmospheric air used as combustion air into mixed gas, and which thereby improves the fuel combustion efficiency while achieving a conservation of fuel and increasing engine output power, and which also exhausts little harmful gases into the atmosphere, thus being unlikely to cause environmental pollution, such as air pollution.

In order to accomplish the above object, the present invention provides a fuel atomizing-injection apparatus, which is installed between a fuel injection device used for injecting pressurized fuel from a fuel tank and an engine-side suction manifold receiving the fuel injected from the fuel injection device, and which heats, sprays, and whirls the injected fuel from the injection device, thus promoting vaporization of the fuel injected from the fuel injection device into the suction manifold.

In an embodiment of the present invention, the fuel atomizing-injection apparatus, comprising: a heater box connected to an injector of a fuel injection device, with a heater box cover being interposed between the heater box and the injector, a cord connector installed outside the heater box cover, a heater-housing cap installed within the heater box at a side of the heater box cover, and having a fuel passage hole along its central axis for allowing fuel injected from the injector to axially pass through, a heater housing installed within the heater box at a side of the heater-housing cap, and having an opening for allowing the fuel from the fuel passage hole of the heater-housing cap to axially pass through, a heater held along the central axis within the opening of the heater housing by a plurality of adjusting screws, with an annular gap being formed between the heater and the heater housing, and a manifold connection tip installed within the heater box at a side of the heater housing, and having a fuel passage hole for allowing the fuel from the heater housing to axially pass through prior to reaching the suction manifold.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
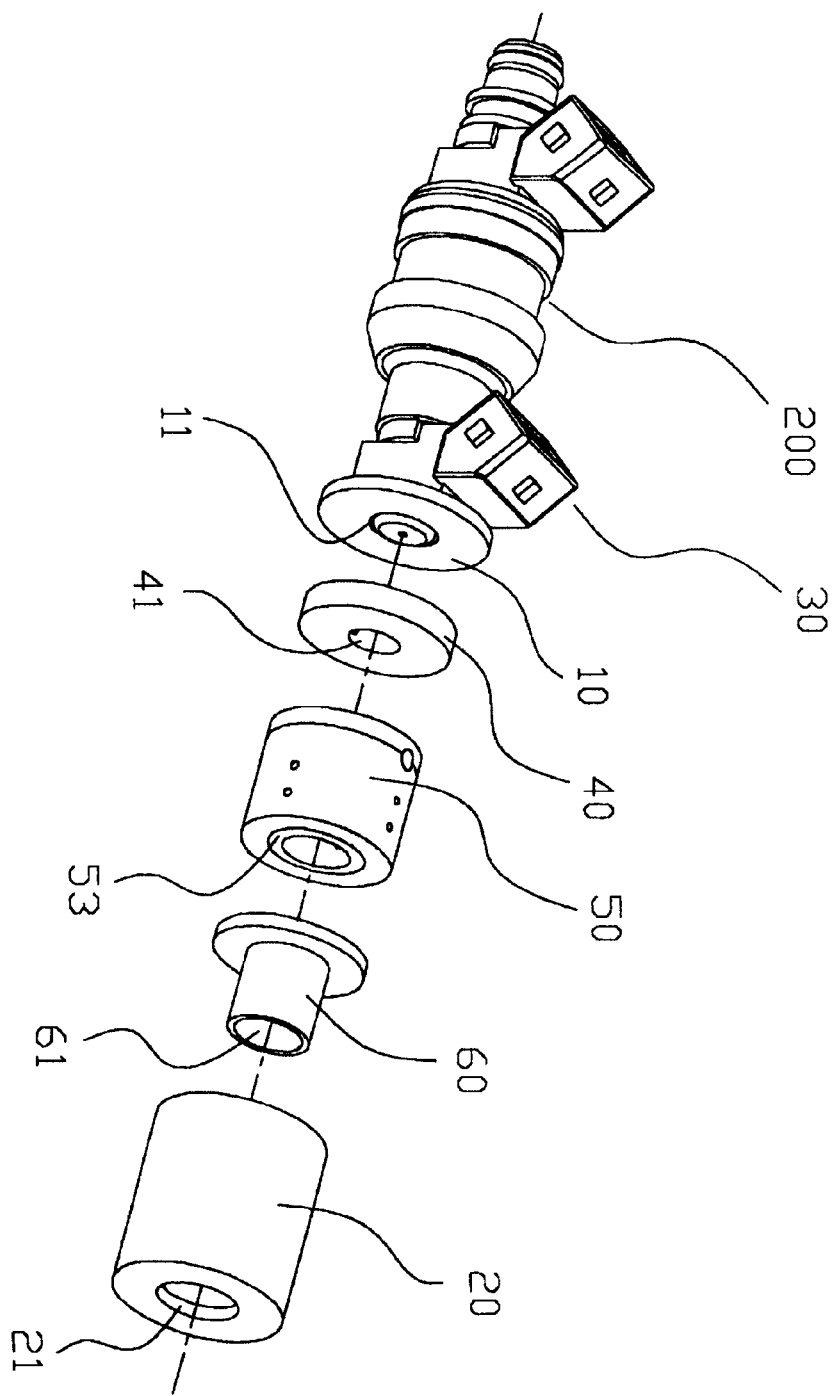
FIG. 1 is an exploded perspective view of a fuel atomizing-injection apparatus in accordance with the preferred embodiment of the present invention.
Figure 2:
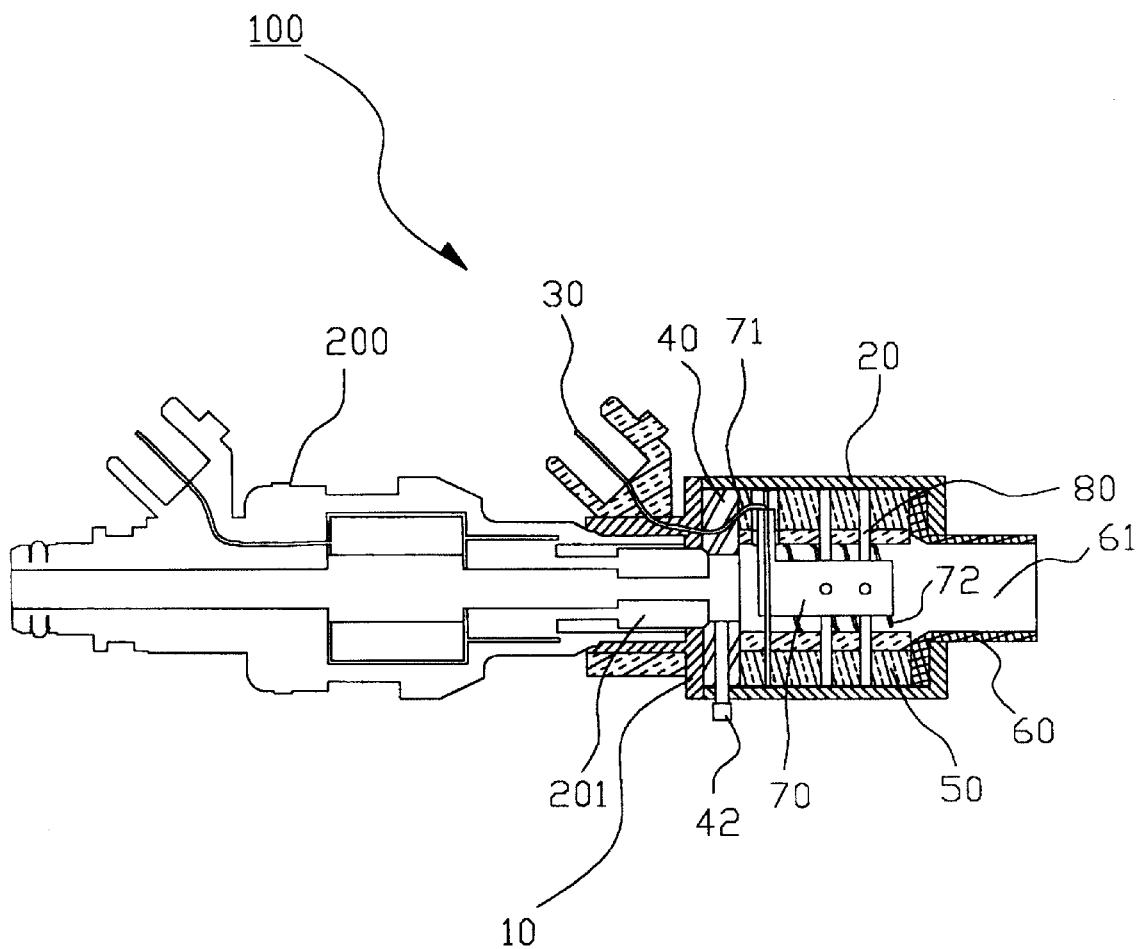
FIG. 2 is a sectional view of the fuel atomizing-injection apparatus of FIG. 1, with the parts of the apparatus being assembled into a single body.

FIG. 1 is an exploded perspective view of a fuel atomizing-injection apparatus in accordance with the preferred embodiment of the present invention. FIG. 2 is a sectional view of the fuel atomizing-injection apparatus of FIG. 1, with the parts of the apparatus being assembled into a single body. As shown in the drawings, the fuel atomizing-injection apparatus 100 of this invention is provided with a heater, and is installed between a fuel injection device used for injecting pressurized fuel from a fuel tank and an engine-side suction manifold receiving the fuel injected from the fuel injection device.

The fuel atomizing-injection apparatus 100 of this invention heats, sprays, and whirls injected fuel from the injector 200 of a fuel injection device, thus promoting vaporization of the fuel injected from the injector 200 into the suction manifold, and accomplishing a desired atomizing-injection of fuel. The fuel atomizing-injection apparatus 100 comprises a heater box cover 10 and a heater box 20. The heater box 20 is connected to the injector 200, with the heater box cover 10 being interposed between the heater box 20 and the injector 200. A cord connector 30 is installed outside the heater box cover 10, while a heater-housing cap 40, a heater housing 50 and a manifold connection tip 60 are sequentially arranged within the heater box 20 in a direction from the injector 200 to the suction manifold (not shown). The apparatus 100 also comprises a heater 70 set within the heater housing 50.

The heater box cover 10 is connected to the needle valve 201 of the injector 200, and has a central axial hole 11 for receiving the needle valve 201 of the injector 200. The heater box 20 is installed at a side of the heater box cover 10 while coming into contact with the cover 10.

The heater box 20 is used for covering and protecting the heater-housing cap 40, the heater housing 50, the heater 70, and the manifold connection tip 60. The above heater box 20 is installed while coming into contact with the heater box cover 10, and seats the heater-housing cap 40, the heater housing 50, the heater 70, and the manifold connection tip 60 therein.

The cord connector 30 is installed outside the heater box cover 10, with an electric cord 71 being set in the connector 30 and extending to the heater 70.

The heater-housing cap 40 is used for intercepting heat from the heater 70 so as to protect the injector 200 from said heat. This cap 40 is installed within the heater box 20 at a position between the heater box cover 10 and the heater housing 50. The above cap 40 also has a fuel passage hole 41 for allowing fuel injected from the injector 200 to pass through. A vacuum prevention check valve 42 is installed at the outside of the cap 40 so as to communicate with the middle position within the fuel passage hole 41. This check valve 42 is used for preventing a reverse flow of fuel within the heater housing, and for preventing vacuum of the interior of the heater housing.

Figure 3:
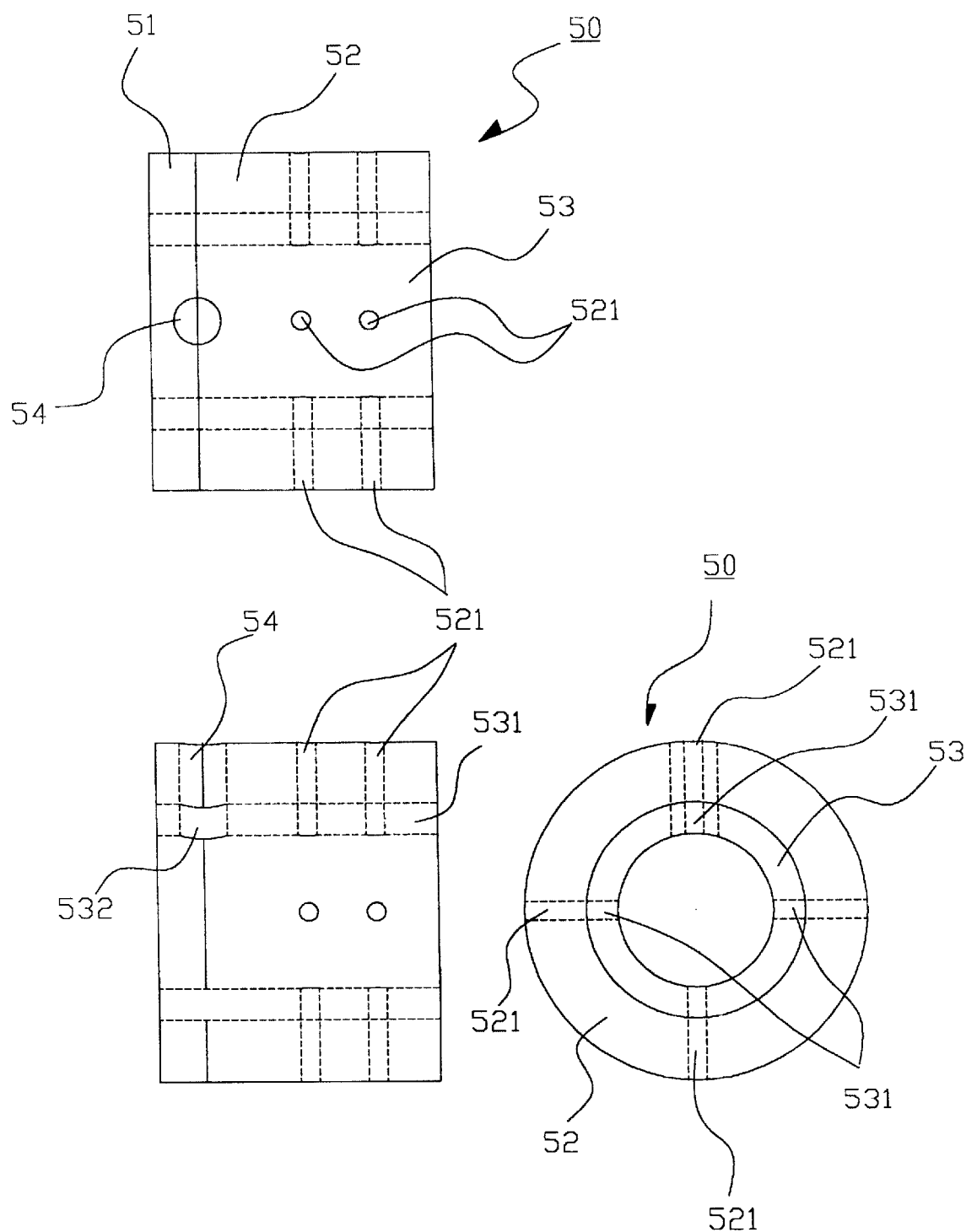
FIG. 3 is a view, showing a heater housing included in the fuel atomizing-injection apparatus of this invention.

The heater housing 50 is set within the heater box 20 at a position between the heater-housing cap 40 and the manifold connection tip 60. As shown in FIG. 3, this heater housing 50 comprises a housing contact part 51, a heat insulating part 52, and a fuel passage hole part 53. The housing contact part 51 is positioned while coming into contact with the heater-housing cap 40, while the heat insulating part 52 is positioned at a side of the housing contact part 51. The fuel passage hole part 53 passes through the center of both the housing contact part 51 and the heat insulating part 52.

The heat insulating part 52 prevents heat dissipation to the outside, and is provided with four sets of first screw holes 521, each set comprising two equally spaced first screw holes 521 and the four sets being arranged on the part 52 while forming a cross-shaped arrangement around the central axis of the fuel passage hole part 53.

The housing contact part 51 is positioned between the heater-housing cap 40 and the heat insulating part 52.

The fuel passage hole part 53 allows fuel from the fuel passage hole 41 of the heater-housing cap 40 to pass through. This fuel passage hole part 53 extends from the housing contact part 51 to the heat insulating part 53. The fuel passage hole part 53 is provided with four sets of second screw holes 531 communicating with the four sets of first screw holes 521 of the heat insulating part 53. A first heater-seating hole 532 is formed on the fuel passage hole part 53 for seating a part of the heater 70 therein.

The first and second screw holes 521 and 532 are linearly formed on the parts 52 and 53 in such a way that the holes 521 and 531 communicate with each other, and extend along the same central axis.

The housing contact part 51 and the heat insulating part 52, connected to each other by the fuel passage hole part 53, are commonly provided with a second heater-seating hole 54 at a position corresponding to the first heater-seating hole 532 of the fuel passage hole part 53. This second hole 54 has the same diameter as that of the first hole 532, and is coaxial with the first hole 532.

The heat insulating part 52 is provided with the four sets of first screw holes 521, each set comprising two equally spaced first screw holes 521 and the four sets being arranged on the heat insulating part 52 while forming a cross-shaped arrangement around the central axis of the fuel passage hole part 53. In addition, the second heater-seating hole 54 is formed at the junction of the housing contact part 51 and the heat insulating part 52 so as to be linearly aligned with the first heater-seating hole 532 of the fuel passage hole part 53.

The heater 70 is axially set within the fuel passage hole part 53 of the heater housing 50 while being partially seated in the heater-seating hole 54 formed at the junction of the housing contact part 51 and the heat insulating part 52 of the heater housing 50. The heater cord 71 extends from the cord connector 30 outside the heater box cover 10 to a part of the heater 70, with the part being positioned within the seating hole 54 at the junction of the housing contact part 51 and the heat insulating part 52 of the heater housing 50. A heat dissipating spiral plate 72 is formed on the external surface of the heater 70 set within the fuel passage hole part 53. The position of the heater 70, axially positioned within the fuel passage hole part 53 along the central axis of the part 53, is precisely controlled and maintained by eight adjusting screws 80, which are radially threaded inwardly into the screw holes 521 and 531 of the heater housing 50.

In an operation of the fuel atomizing-injection apparatus of this invention, fuel, injected from the injector 200, flows through the fuel passage hole 41 of the heater-housing cap 40, and flows into the fuel passage hole part 53 of the heater housing 50. Within the heater housing 50, the fuel passes through the annular gap between the heater 70 and the internal surface of the fuel passage hole part 53. In such a case, the axial position of the heater 70 within the fuel passage hole part 53 is precisely controlled and maintained by the adjusting screws 80. When the fuel flows through the annular gap between the heater 70 and the internal surface of the fuel passage hole part 53 as described above, the fuel current is deflected by coming into contact with the heat dissipating spiral plate 72, and so a vortex is formed in the fuel current.

The manifold connection tip 60 is mounted to the end of the heater housing 50 at one end thereof, and is connected to the suction manifold (not shown) at the other end thereof. This connection tip 60 is provided with an axial hole 61 for allowing fuel from the heater housing 50 to pass through so as to reach the suction manifold.

In the apparatus of this invention, the fuel passage hole 41 of the heater-housing cap 40, the fuel passage hole part 53 of the heater housing 50, the axial hole 61 of the manifold connection tip 60, and the hole 21 of the heater box 20 are coaxially formed to be aligned with each other. In addition, the electric cord 71 extends from the heater 70 at the heater-seating hole 54, formed at the junction of the housing contact part 51 and the heat insulating part 52, to the cord connector 30 outside the heater box cover 10.

In order to assemble the fuel atomizing-injection apparatus of this invention, the heater 70, provided with the heat dissipating spiral plate 72 in its external surface, is arranged along the central axis within the heater housing 50 that consists of three parts: the housing contact part 51, the heat insulating part 52 and the fuel passage hole part 53. In such a case, the heater 70 is stably and controllably held in its desired position within the heater housing 50 by the eight adjusting screws 80 radially set in the heater housing 50. After the heater 70 is set within the heater housing 50, both the heater-housing cap 40 and the manifold connection tip 60 are mounted to opposite ends of the heater housing 50. Thereafter, the heater housing 50, with both the heater-housing cap 40 and the manifold connection tip 60, is assembled with both the needle valve 201 of the injector 200 and the suction manifold of an engine at opposite ends thereof. In such a case, the cylindrical heater box 20 covers and protects the heater housing 50, while the heater box cover 10 is installed at the junction of the heater box 20 and the injector 200.

In an operation of the fuel atomizing-injection apparatus of this invention, fuel is injected from the injector 200 into the apparatus prior to reaching the suction manifold of the engine. Within the fuel atomizing-injection apparatus, the fuel primarily passes through the fuel passage hole 41 of the heater-housing cap 40, and is introduced into the fuel passage hole part 53 of the heater housing 50. Within the heater housing 50, the fuel passes through the annular gap between the heater 70 and the internal surface of the fuel passage hole part 53. In such a case, the fuel current flows against the heat dissipating spiral plate 72, and so the fuel is actively sprayed and forms a vortex. In addition, the heater 70 effectively heats the fuel flowing in the heater housing 50, thus promoting vaporization of the fuel. The fuel is, therefore, sufficiently atomized, and is injected into the suction manifold of the engine through the hole 61 of the manifold connection tip 60.

As described above, the present invention provides a fuel atomizing-injection apparatus for internal combustion engines. The fuel atomizing-injection apparatus is provided with a heater, which has a heat dissipating spiral plate on its external surface and is installed between the injector of a fuel injection device and the suction manifold of an engine. The apparatus thus heats and sprays the injected fuel and makes a vortex in the fuel current, thus promoting vaporization of the fuel injected from the injector into the suction manifold and finally allowing the injected fuel to be more effectively and actively mixed with atmospheric air used as combustion air into mixed gas.

The fuel atomizing-injection apparatus of this invention thus improves the fuel combustion efficiency of the engine while achieving a conservation of fuel and increasing engine output power. This apparatus also exhausts little harmful gases into the atmosphere, thus being unlikely to cause environmental pollution, such as air pollution.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fuel atomizing-injection apparatus, comprising:
   a heater box connected to an injector of a fuel injection device, with a heater box cover being interposed between said heater box and said injector;
   a cord connector installed outside said heater box cover;
   a heater-housing cap installed within said heater box at a side of said heater box cover, said heater-housing cap having a fuel passage hole along its central axis for allowing fuel injected from said injector to axially pass through;
   a heater housing installed within said heater box at a side of said heater-housing cap, said heater housing having an opening for allowing the fuel from said fuel passage hole of the heater-housing cap to axially pass through;
   a heater held along a central axis within the opening of said heater housing by a plurality of adjusting screws, with an annular gap being formed between the heater and the heater housing; and
   a manifold connection tip installed within said heater box at a side of said heater housing, said manifold connection tip having a fuel passage hole for allowing the fuel from said heater housing to axially pass through prior to reaching the suction manifold.

2. The fuel atomizing-injection apparatus according to claim 1, wherein said heater is provided with a heat dissipating spiral plate on its external surface.

3. The fuel atomizing-injection apparatus according to claim 1, wherein heater housing comprises:
   a housing contact part positioned to come into contact with said heater-housing cap at a surface thereof;
   a heat insulating part positioned at a side of said housing contact part; and
   a fuel passage hole part extending through a center of both the housing contact part and the heat insulating part.

4. The fuel atomizing-injection apparatus according to claim 1, wherein a vacuum prevention check valve is installed at a middle position of said fuel passage hole of the heater-housing cap so as to prevent a reverse flow of fuel within said heater housing, and to prevent vacuum of the interior of said heater housing.

* * * * *